March 22, 1960 E. E. MURRAY 2,929,486
SEALED CONVEYOR
Filed July 31, 1958 2 Sheets-Sheet 1
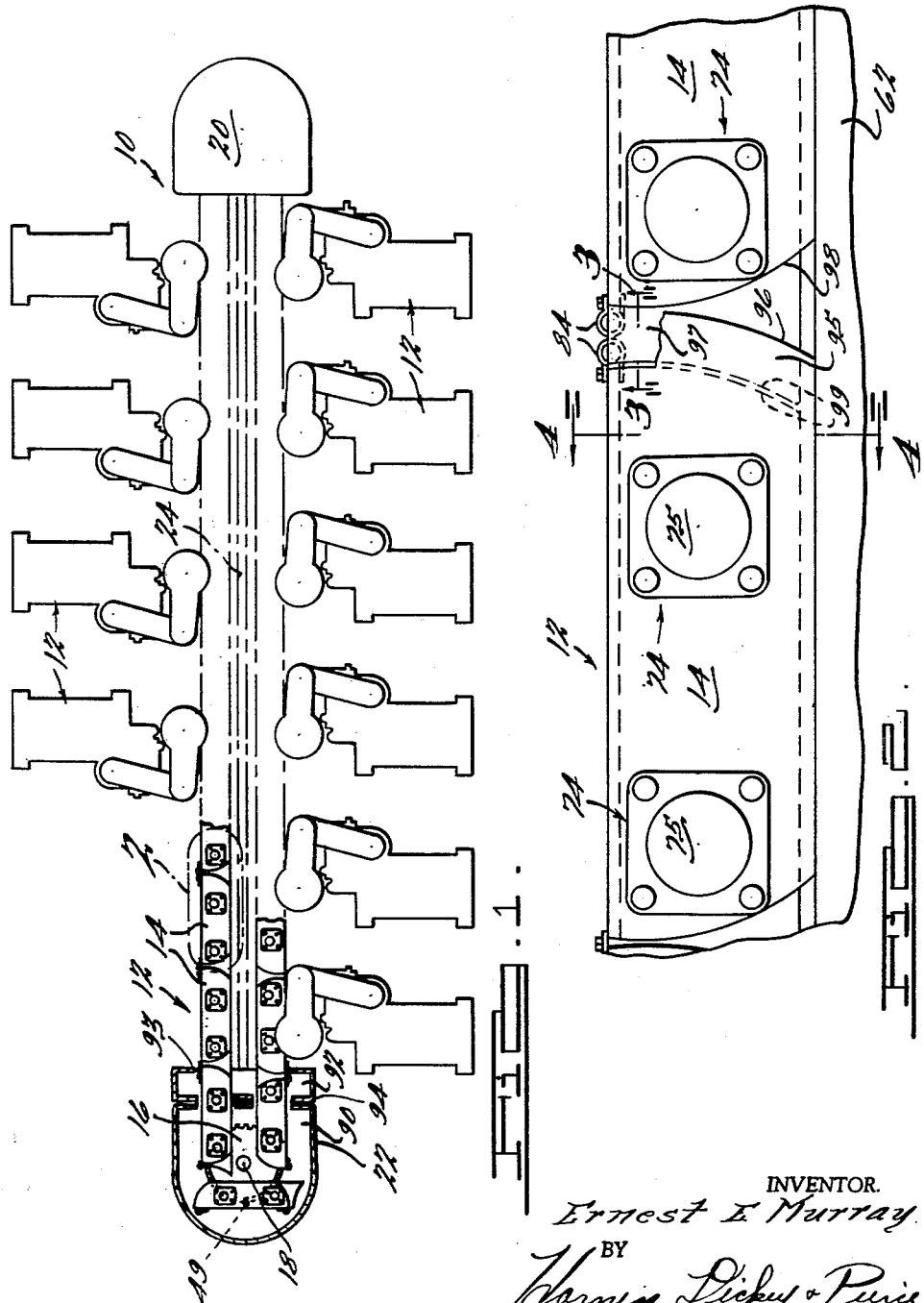
INVENTOR.
Ernest E. Murray
BY
Harness, Dickey & Pierce
ATTORNEYS March 22, 1960 E. E. MURRAY 2,929,486
SEALED CONVEYOR
Filed July 31, 1958 2 Sheets-Sheet 2
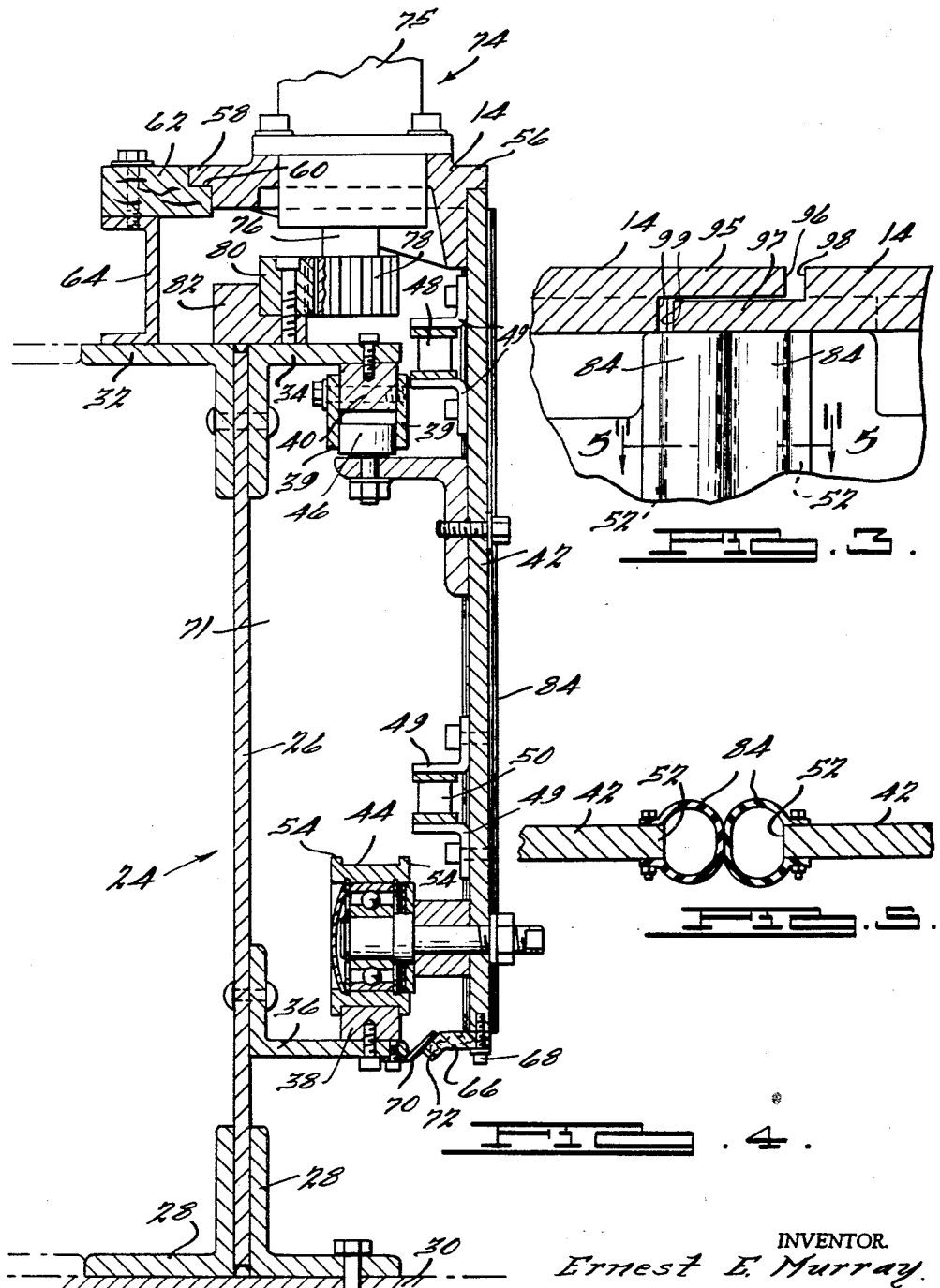
INVENTOR.
Ernest E. Murray.
BY
Harness, Dickey & Pierce
ATTORNEYS United States Patent Office 2,929,486
Patented Mar. 22, 1960

2,929,486

SEALED CONVEYOR

Ernest E. Murray, Birmingham, Mich.

Application July 31, 1958, Serial No. 752,364

8 Claims. (Cl. 198—19)

This invention relates generally to conveying apparatus and more particularly to conveying apparatus intended for use in buffing, polishing, grinding and similar operations wherein the fine particles removed from the workpieces and the buffing tools and commonly referred to as "dust" present a serious obstacle to efficient, long-time use of the conveyor.

In most system of the above type, and hereinafter referred to collectively as "buffing operations," now in general use, the conveyors, motor parts, drive gearing, mechanisms for moving the workpieces on the conveyor, and any other moving parts are rapidly clogged up and quickly worn out by the abrasive action of this dust. As a result, it is difficult to maintain a buffing and polishing system in operation for a continued period of time without constant maintenance supervision and without periodically replacing the conveyor parts and the parts of the buffing and polishing machines arranged near the conveyor.

It is an object of this invention, therefore, to provide a conveyor in which the moving parts are substantially enclosed during operation of the conveyor so that the dust incident to the buffing operations cannot contact the moving parts.

Another object of this invention is to provide a conveyor of the above type which is provided with a blower system for continually blowing air through any openings in the conveyor enclosure for positively preventing any travel of dust through these openings.

Still another object of this invention is to provide a conveyor of the above type which is simple in construction, economical to manufacture, and which will operate efficiently over a prolonged service life.

Further objects, advantages and features of this invention will become apparent from a consideration of the following description, the appended claims, and the accompanying drawing, in which:

Figure 1 is a top plan view of the conveyor of this invention, illustrated in assembly relation with a plurality of buffing or polishing machines;

Fig. 2 is an enlarged fragmentary view of the portion of the conveyor of this invention enclosed within the broken line indicated at "2" in Fig. 1;

Figs. 3 and 4 are sectional views looking along the lines 3—3 and 4—4 in Fig. 2; and Fig. 5 is a fragmentary sectional view looking along the line 5—5 in Fig. 3.

With reference to the drawings, the conveyor of this invention, indicated generally at 10, is illustrated in Fig. 1 in assembly relation with a plurality of buffing or polishing machines 12 arranged on opposite sides of the conveyor. The conveyor 10, includes an endless chain assembly 12 consisting of a plurality of horizontal platen members 14 mounted for movement in opposite directions along an endless path. The chain assembly 12 is mounted for movement about a pair of drive sprockets 16, only the upper one of which is shown, mounted on an upright shaft 18 and enclosed within a hood 22 located at one end of the path of travel for the chain assembly 12. A pair of similar idler sprockets (not shown) at the opposite end of the path are arranged in a spaced relation with the drive sprockets 16 and enclosed within a hood 20.

The chain assembly 12 travels on an upright frame structure 24 (Figs. 1 and 4) arranged between the drive and idler sprockets and also between the portions of the chain assembly which are moving in opposite directions. The frame assembly 24 consists of connected identical upright half portions, only one of which is illustrated in Fig. 4, and each of which includes an upright supporting plate 26 provided at its lower end with angle iron supports 28 secured to the supporting floor surface 30 or any other desired supporting surface. At its upper end, the plate 26 carries a pair of similar angle members 32 and 34. An angle member 36 secured to the plate 26 intermediate the upper and lower ends thereof, carries an upwardly facing horizontal rail or track member 38 arranged in vertical alignment with a track assembly 40 carried on the angle member 34. The assembly 40 includes spaced depending side plates 39.

As shown in Fig. 4, a platen 14 is secured to a downwardly extending mounting plate 42 which carries lower supporting rollers 44 and upper guide rollers 46. The lower rollers 44 are supported for rolling movement on the rail 38 and are provided with flanges 54 that are positioned on opposite sides of the rail and prevent accidental travel of the rollers off the rail. The upper rollers 46 are confined between the track plates 39 and guide the platens 14 along a straight line path. Upper and lower endless chains 48 and 50, respectively, are each trained about one pair of horizontally aligned drive and idler sprockets and carry the platens 14. Each chain 48 and 50 is connected, as shown in Fig. 4, by brackets 49 at positions midway between the leading and trailing ends 52 of the plate so that the plates 42 readily travel about the sprockets during driving of the sprockets 16.

The upper end of each plate 42 is secured to the outer side 56 of its corresponding platen member 14. The inner side of each platen member 14 consists of a reduced section 58 which projects into a recess shaped to receive the section 58 formed on a guide member 62 supported on a channel member 64 which in turn is supported on the angle member 32. The guide member 62 is preferably formed of wood and has a horizontal shoulder 60 which is disposed below and adjacent to the section 58. Any space between the guide member 62 and the section 58 of each platen 14 readily fills with dust from the buffing operation and prevents travel of the dust into contact with the moving parts of the conveyor 10, which are located below the guide member 62. This dust acts to seal the space between the guide member 62 and each section 58, and facilitates sliding of the sections 58 on the guide member.

At its lower end, the conveyor is sealed by flexible strips 66 secured by bolts 68 to the lower end of the plates 42 and arranged in sliding engagement with an inclined metal plate 70 carried by the angle member 36. Each strip 66 is formed of a flat seal or belting material and tends to assume a flat position. The location of the inclined plate 70 provides for a bending of the terminal portion 72 of each strip 66 into tight frictional engagement with the plate 70 to maintain an effective seal between each moving plate 42 and the stationary angle member 36. Adjacent ends of adjacent strips 66 are arranged in an abutting relationship to prevent travel of dust therebetween.

It is seen, therefore, that the guide member 62 coacts with the platen 14 to prevent dust from entering the top side of the conveyor 10. Similarly, the sealing strips 66 coact with the metal plate 70 to prevent travel of dust into the conveyor at the underside thereof. Accordingly, a substantially dust tight chamber 71 is formed inside the conveyor 10, with the chamber 71 being bounded by the plates 26 and 42, the platen 14, guide member 62 and channel member 64, the angle member 36, and the plate 70 and sealing strips 66. Stated otherwise, the work supporting structures, consisting of the platens 14 and the plates 42 co-operate with the frame assembly 24 to enclose chambers 71 on opposite sides of the frame assembly 24.

On its topside, each platen 14 carries a fixture, designated generally 74, for supporting a particular workpiece. The fixture 74 includes a body 75 bolted to the platen 14 and a depending shaft 76 rotatably supported on the body 75 and provided on its lower end with a gear 78 which meshes with a rack 80 secured to a block 82 supported on the angle members 32 and 34 above the plate 26. During travel of a platen 14, the engagement of the gear 78 with the rack 80 provides for rotation of the workpiece during buffing and polishing of the workpiece. It is to be understood of course, that the racks 80 are located so that the workpieces are rotated only during the portions of their travel in which they are being subjected to the action of the buffing machines 12, namely during their travel between the hoods 20 and 22.

As shown in Fig. 4, the rack 80 and the gear 78 are located within the chamber 71 for the conveyor so that they are fully protected from dust.

To preclude travel of dust between adjacent plates 42, both the leading and trailing end 52 of each plate 42 is provided with a resilient seal member 84. As shown in Fig. 5, each seal member 84 is of an elongated substantially C-shape configuration in transverse section to provide the member 84 with the desired yieldable characteristics. Each member 84 has flat terminal end portions 85 which are secured to opposite sides of the plate 42 at one end 52 thereof so that a pair of members 84 at adjacent ends of adjacent plates 42 are engageable, as shown in Fig. 5, to form a seal which positively precludes any travel of dust therebetween. Each seal member extends vertically between the upper and lower ends of the supporting plate 42 therefor. As shown in Fig. 3, the adjacent ends of adjacent platens 14 have upper and lower overlapping portions 95 and 97 so as to form a lap joint therebetween.

Each pair of engaging seal members 84 engages the under side of a lower platen end portion 97 so as to be sealed at their upper ends with the adjacent platens 14. The end portion 95 on each platen 14 has a curved terminal edge 96 positioned adjacent a facing edge 98 of the adjacent platen 14 which is also curved so as not to interfere with relative pivotal movement of the platens 14. The facing edges 99 (Fig. 2) of the platens 14 below the edges 96 and 98 are likewise curved for the same purpose.

The hoods 20 and 22 are provided at the ends of the conveyor 10 for preventing travel of dust into the conveyor during separation of adjacent sealing members 84 as adjacent plates 42 travel separately around the drive and idler sprockets. Stated otherwise, as a plate 42 travels about an idler sprocket 16 or a drive sprocket so as to reverse the direction of movement, the plate 42 is separated at its ends from the adjacent plates 42 only within the hoods 20 and 22.

As shown in Fig. 1, in which only the hood 22 is shown in detail, it being understood that the hood 20 is identical, a hood consists of a pair of sections, namely a first positive pressure section 90 and a second smaller negative pressure section 92 with the negative pressure section 92 being located inwardly of the conveyor 10 relative to the section 90. The hood sections 90 and 92 are separated by partitions 94 which have openings (not shown) of a size and shape to provide for travel of the workpieces on the platens 14 through the partitions 94. A similar partition 93 closes the hood and has similar openings formed therein to minimize air loss from the hood. Air blown into the positive pressure hood section 90 travels through the spaces between the stationary supporting plate 26 and the movable platen supporting plates 42 so as to expel air through any of the small openings which may be formed in the conveyor 10 through parts which are not completely sealed. The negative pressure sections 92 draw off dust from the workpieces entering the hood and from the surrounding air in the room for travel into a filter or receptacle of suitable type.

From the above description, it is seen that this invention provides a conveyor 10 which is substantially dust-proof and is thus usable over a prolonged service life. Since all of the parts of the conveyor 10 which provide for a drive of the conveyor and for the desired rotation of the workpieces are enclosed within either the chamber 71 or the hoods 20 and 22, these parts are protected from the abrasive and clogging action of the dust.

It is apparent that the platens 14 and plates 42 co-operate to form inverted L-shape work supporting structures which are capable of supporting workpieces at either horizontal or vertical positions supported on any portion of the structures. By virtue of the shape and location of a work supporting structure, it co-operates with the frame assembly 24 to enclose the chamber 71 within which the rollers and tracks are located.

Although the invention has been described with respect to a preferred embodiment thereof, it is to be understood that it is not to be so limited since changes can be made therein which are within the scope of this invention as defined by the appended claims.

What is claimed is:

1. A conveyor assembly comprising an upright horizontally elongated frame, vertically spaced guide rails on said frame, a plurality of work supporting structures movable in an endless horizontal path about said frame and supported on said rails, each of said supporting structures being of a shape in vertical cross section such that it co-operates with the frame to form a horizontally extending space therebetween in which said rails are located, each of said structures having a first pair of opposite edge portions which are substantially parallel to the direction of movement of said structures and being continuous and imperforate between said edge portions, each of said structures having a second pair of opposite edge portions substantially perpendicular to said first pair, engageable sealing means on adjacent ones of said second edge portions, and coacting sealing means on said frame and said first edge portions for preventing dust and the like from traveling inwardly of said conveyor into said horizontally extending spaces.

2. A conveyor assembly comprising a frame, guide rails on said frame, a plurality of work supporting structures movable in an endless path about said frame and supported on said rails at positions such that said rails are located generally between portions of said frame and said work supporting structures, each of said structures having a pair of opposite edge portions which are substantially parallel to the direction of movement of said structures and being continuous and imperforate between said edge portions, engageable sealing means on adjacent ones of said supporting structures and coacting sealing means on said frame and said pair of edge portions for preventing dust and the like from traveling into the space occupied by said rails between said frame and said supporting structures.

3. A conveyor assembly comprising a frame, guide rails on said frame, a plurality of work supporting structures supported on said rails and movable in an endless path about said frame and said rails, each of said structures having a first pair of opposite edge portions which are substantially parallel to the direction of movement of said structures and being continuous and imperforate between said edge portions, each of said structures having a second pair of opposite edge portions substantially perpendicular to said first pair, engageable sealing means on adjacent ones of said second edge portions, and coacting sealing means on said frame and said first edge portions for preventing dust and the like from traveling inwardly of said conveyor into contact with said guide rails.

4. A conveyor assembly for buffing operations and the like wherein an abrasive dust is incident to each operation, said assembly comprising an upright horizontally elongated frame, a plurality of work supporting structures arranged in a horizontal endless line extending about said frame, coacting sprocket and chain means connected to said structures for moving said line along an endless path having parallel portions arranged on opposite sides of said frame, each of said supporting structures having a generally horizontal portion provided with opposite side edges and an upright portion depending from one of said side edges in a spaced relation with said frame, said upright portion having a lower edge, first coacting relatively movable sealing means on said frame and the other one of said side edges and second coacting relatively movable sealing means on said frame and said lower edge, cooperating roller and track means on said structures and said frame located between said frame and said upright portion, third sealing means at adjacent ends of adjacent supporting structures, and hood means at opposite ends of said conveyor communicating with the space between said structures and said frame and operable to deliver air thereto for travel outwardly through any openings in said sealing means.

5. A conveyor assembly comprising a frame, a plurality of work supporting structures, an endless chain extending about said frame and connected to each of said structures at a central portion thereof for moving the structures along an endless path extending about said frame, sprockets at each end of said frame supporting said chain for travel along said path, said structures having opposite spaced edge portions which are substantially parallel to the direction of movement of said structures, said structures cooperating with said frame to enclose a space therebetween, cooperating guide tracks and rollers on said frame and said structure located in said space and providing a movable support of said structures on said frame, seal means at adjacent ends of adjacent structures arranged in sealing engagement during travel of said adjacent structures between said sprockets, and coacting seal means on said frame and said edge portions of each structure extending between the ends thereof at opposite sides of said space.

6. A conveyor assembly comprising a frame, a plurality of work supporting structures movable in a line along cooperating sprocket and chain means mounted on said frame and connected to said structures for moving the structures along an endless path extending about said frame, said structures having opposite spaced edge portions which are generally parallel to the direction of movement of said structures, coacting seal means on said frame and said edge portions of said supporting structures extending between the ends of said supporting structures in a direction parallel to the direction of movement thereof, said structures cooperating with said frame to enclose a space therebetween, cooperating guide tracks and rollers on said frame and said structures located in said space and providing for a support of said structures on said frame, and seal means at adjacent ends of adjacent structures arranged in sealing engagement during travel of said adjacent structures along portions of said paths.

7. A conveyor assembly comprising an upright horizontally elongated frame, guide rails on said frame, a plurality of work supporting structures arranged in a horizontal endless line extending about said frame and supported on coacting sprocket and chain means connected to said structures for moving said line along an endless path having parallel portions arranged on opposite sides of said frame, each of said supporting structures being of a shape in vertical cross section such that it co-operates with the frame to form a horizontally extending space therebetween and having a generally horizontal portion provided with opposite side edges and an upright portion depending from one of said side edges and having a lower edge, co-operating roller and track means on said structures and said frame located in said space, first coacting relatively movable sealing means on said frame and the other one of said side edges and second coacting relatively movable sealing means on said frame and said lower edge, and third coacting sealing means on said structures at adjacent ends of adjacent supporting structures including overlapping horizontal portions.

8. A conveyor assembly comprising an upright horizontally elongated frame, guide rails on said frame, a plurality of work supporting structures arranged in a horizontal endless line extending about said frame and supported on coacting sprocket and chain means connected to said structures for moving said line along an endless path having parallel portions arranged on opposite sides of said frame, each of said supporting structures being of a shape in vertical cross section such that it co-operates with the frame to form a horizontally extending space therebetween and having a generally horizontal portion provided with opposite side edges and an upright portion depending from one of said side edges and having a lower edge, co-operating roller and track means on said structures and said frame located in said space, first coacting relatively movable sealing means on said frame and the other one of said side edges and second coacting relatively movable sealing means on said frame and said lower edge, third sealing means at adjacent ends of adjacent supporting structures, workpiece supporting bodies on said structures, shaft means carried by each of said bodies for rotating the workpiece carried thereby and projecting into said space, gear means on each shaft in said space, and rack means carried by said frame and engageable with said gear means.

References Cited in the file of this patent
UNITED STATES PATENTS
2,793,733  Karageorgieff _____ May 28, 1957